(12) United States Patent
Tajika et al.

(10) Patent No.: US 9,935,368 B2
(45) Date of Patent: Apr. 3, 2018

(54) ANTENNA CONTROL METHOD AND ANTENNA CONTROL SYSTEM

(71) Applicants: HIWAVE, INC., Yongin-si, Gyeonggi-do (KR); SOFTBANK CORP., Minato-ku, Tokyo (JP)

(72) Inventors: Akihiko Tajika, Minato-ku (JP); Junichi Miyakawa, Minato-ku (JP); Yoshihito Shimazaki, Minato-ku (JP); HaeWoon Lee, Yongin-si (KR); CheolHoon Lee, Uiwang-si (KR)

(73) Assignees: HIWAVE, INC. (KR); SOFTBANK CORP., Tokyo (JP)

( * ) Notice: Subject to any disclaimer, the term of this patent is extended or adjusted under 35 U.S.C. 154(b) by 257 days.

(21) Appl. No.: 14/767,470

(22) PCT Filed: Feb. 13, 2014

(86) PCT No.: PCT/JP2014/053356
§ 371 (c)(1),
(2) Date: Aug. 12, 2015

(87) PCT Pub. No.: WO2014/126161
PCT Pub. Date: Aug. 21, 2014

(65) Prior Publication Data
US 2015/0380816 A1   Dec. 31, 2015

(30) Foreign Application Priority Data

Feb. 14, 2013  (KR) .................. 10-2013-0015797
Dec. 2, 2013   (KR) .................. 10-2013-0148528

(51) Int. Cl.
*H01Q 3/36*   (2006.01)
*H01Q 1/12*   (2006.01)
(Continued)

(52) U.S. Cl.
CPC ............... *H01Q 3/36* (2013.01); *H01Q 1/005* (2013.01); *H01Q 1/1271* (2013.01);
(Continued)

(58) Field of Classification Search
CPC .......... H01Q 3/36; H01Q 21/06; H01Q 1/005; H01Q 3/247; H01Q 1/1271; H01Q 9/0407;
(Continued)

(56) References Cited

U.S. PATENT DOCUMENTS 5,220,335 A * 6/1993 Huang ................ H01O 1/38
343/700 MS
9,083,086 B2 * 7/2015 Chan .................. H01Q 9/0407
(Continued)

FOREIGN PATENT DOCUMENTS

JP    2002-271832 A    9/2002
JP    2007-524273 A    8/2007
(Continued)

OTHER PUBLICATIONS

Korean Patent Office action in corresponding Korean Patent Application No. 10-2015-7025041 dated May 18, 2016 with English translation, 10 pages.
(Continued)

*Primary Examiner* — Andrew Lai
*Assistant Examiner* — Harry H Kim
(74) *Attorney, Agent, or Firm* — Lewis Roca Rothgerber Christie LLP (57) ABSTRACT

An object of the present invention is to provide an antenna control system and a method capable of consistently maintaining an optimum orientation point between a donor antenna and an adjacent base station. The antenna control system for receiving a signal from a base station includes a donor antenna including an antenna module disposed by
(Continued)

being fixed to an inner side of a window glass and configured with an array antenna; a phase shifter including a plurality of transmission lines; and a phase controller configured to control the phase shifter to change an orientation direction of the antenna module; and a repeater including a measuring module for measuring a reception signal received by the antenna module; an analyzing module for analyzing a signal quality parameter in each orientation direction of the antenna module based on a measurement result of the measuring module; and a generating module for generating an antenna control signal for controlling the orientation direction of the antenna module based on an analysis result of the analyzing module.

12 Claims, 9 Drawing Sheets

(51) Int. Cl.
| | | |
|---|---|---|
| *H01Q 9/04* | (2006.01) | |
| *H01Q 1/00* | (2006.01) | |
| *H01Q 3/24* | (2006.01) | |
| *H01Q 21/06* | (2006.01) | |
| *H04B 7/02* | (2017.01) | |
| *H04B 7/155* | (2006.01) | |
| *H04W 24/02* | (2009.01) | |
| *H04W 88/08* | (2009.01) | |
| *H04B 7/026* | (2017.01) | |

(52) U.S. Cl.
CPC .......... *H01Q 3/247* (2013.01); *H01Q 9/0407* (2013.01); *H01Q 21/06* (2013.01); *H04B 7/026* (2013.01); *H04B 7/1555* (2013.01); *H04W 24/02* (2013.01); *H04W 88/08* (2013.01)

(58) Field of Classification Search
CPC ...... H04W 24/02; H04W 88/08; H04B 7/026; H04B 7/1555
See application file for complete search history.

(56) References Cited

U.S. PATENT DOCUMENTS

| | | | |
|---|---|---|---|
| 2001/0031648 A1* | 10/2001 | Proctor, Jr. ............ | H01Q 1/246 455/562.1 |
| 2003/0179138 A1* | 9/2003 | Chen ..................... | G06F 1/1616 342/372 |
| 2004/0263390 A1 | 12/2004 | Merenda et al. | |
| 2007/0161348 A1* | 7/2007 | Gribben ................ | H04W 88/08 455/13.3 |

FOREIGN PATENT DOCUMENTS

| | | |
|---|---|---|
| JP | 2007-228414 A | 9/2007 |
| JP | 2009-246809 A | 10/2009 |
| JP | 2010-4457 A | 1/2010 |
| JP | 2011-211281 A | 10/2011 |
| JP | 2012-15826 A | 1/2012 |

OTHER PUBLICATIONS

International Search Report for International Application No. PCT/JP2014/053356, dated May 20, 2014, 4pp.

* cited by examiner

ANTENNA CONTROL METHOD AND ANTENNA CONTROL SYSTEM

CROSS-REFERENCE TO RELATED APPLICATION(S)

This application is a National Phase Patent Application and claims the priority of International Application Number PCT/W2014/053356, filed on Feb. 13, 2014, which claims priority of Korean Patent Application Numbers 10-2013-0015797, filed on Feb. 14, 2013 and 10-2013-0148528, filed on Dec. 2, 2013, the entire contents of which are incorporated herein.

TECHNICAL FIELD

The present invention relates to an antenna control method and the antenna control system.

DESCRIPTION OF THE RELATED ART

BACKGROUND

A mobile communication repeater is used to enable communication of a mobile communication telephone in a room where a mobile communication signal intensity is weak. The mobile communication repeater is a device which is installed in a place where a radio wave is weak or cannot reach between a base station and a terminal and supplies an excellent signal thereto to enable a stable wireless communication service.

Generally, a donor antenna installed in an outdoor location, where an electric field intensity is high, supplies a signal received from the base station to the mobile communication repeater installed in a room, and the mobile communication repeater appropriately amplifies the signal and supplies the signal to an indoor antenna (Service Antenna).

However, the donor antenna needs to be in a state facing an adjacent base station, and thus the donor antenna is installed outdoors so that its installation direction appropriately faces the adjacent base station. In a configuration of the mobile communication repeater, an antenna cable needs to be drawn into the room by penetrating through a wall surface in order to connect the donor antenna installed in the outdoor location to the indoor mobile communication repeater.

If the donor antenna is installed in the room to avoid penetration of the antenna cable through the wall surface, the direction of the donor antenna installed in the room needs to be set to an appropriate angle to face the adjacent base station.

In this case, there is a problem that irregular reflection caused by wall surfaces of the building and indoor structures makes it difficult to bring a facing state to the base station into an optimum state, and a reflected wave of the irregular reflection is fed back to another antenna, namely the service antenna, of the mobile communication repeater installed in the room and causes oscillation.

As described above, even if the donor antenna is installed in the room and a through-hole for drawing in the antenna on the wall surface of the building is not used, but if a window direction does not coincide with the direction of the base station, the base station and the antenna attached on the wall surface do not face each other. Accordingly, a radio wave from the base station does not advance in a main radiation direction of the antenna, and the donor antenna cannot serve a function of relaying signals since optimum transmission and reception of radio waves cannot be performed with the base station. Patent literature 1 discloses a repeater which includes a donor antenna and a service antenna in one casing and relays communication between a base station and a mobile station by being installed in a room.

CITATION LIST

Patent Literature

Patent literature 1: Japanese Laid-open Patent Publication No. 2011-211281

SUMMARY

The repeater described in Patent literature 1 has an advantage of not using a through-hole for drawing in an antenna on a wall surface of a building. However, since the repeater is installed in the room, irregular reflection may be caused by wall surfaces of the building and indoor structures, and there is a problem that an orientation direction of the donor antenna needs to be changed which makes it difficult to optimize transmission and reception of radio waves between the base station and the donor antenna.

The present invention is directed to solve the conventional problem and adopts a configuration in which a donor antenna is attached to a glass window without piercing a hole for drawing in the antenna on a wall surface in order to minimize an effect of irregular reflection caused by wall surfaces of a building and indoor structures. Further, a signal quality parameter of a radio signal received by the donor antenna from each beam direction in a state attached to the glass window is created and an orientation direction of the donor antenna is optimally and automatically set based on an analysis result of the created parameter. Accordingly, an object of the present invention is to provide an antenna control method capable of reducing costs for installation and maintenance management and consistently maintaining an optimum orientation point between the donor antenna and an adjacent base station and a system for executing the method.

Problems to be solved by the present invention are not limited to the above-described problems, and other problems not mentioned can be clearly understood by a person skilled in the art from below descriptions.

An antenna control system for receiving a signal from a base station includes a donor antenna including an antenna module disposed by being fixed to an inner side of a window glass and configured with an array antenna; a phase shifter including a plurality of transmission lines; and a phase controller configured to control the phase shifter to change an orientation direction of the antenna module, and a repeater including a measuring module for measuring a reception signal received by the antenna module; an analyzing module for analyzing a signal quality parameter in each orientation direction of the antenna module based on a measurement result of the measuring module; and a generating module configured to generate an antenna control signal for controlling the orientation direction of the antenna module based on an analysis result of the analyzing module.

According to the antenna control system, it is preferable that the repeater further includes a service antenna configured to transmit a radio signal based on a reception signal received by the antenna module.

It is preferable that the antenna control system further includes a feeder wire configured to transmit the antenna control signal to the phase controller.

According to the antenna control system, it is preferable that the antenna module includes a plurality of individual antennas, and each of the individual antennas of the antenna module includes a first patch antenna disposed by being separated at a predetermined distance away from a glass window side and a second patch antenna disposed by being separated at a predetermined distance away from the first patch antenna.

According to the antenna control system, it is preferable that the donor antenna further includes a metallic reflector disposed on a rear surface of the second patch antenna.

According to the antenna control system, it is preferable that the donor antenna further includes a plate-shaped metal section disposed around the first patch antenna.

According to the antenna control system, it is preferable that the repeater further includes a signal multiplexing module for supplying to the donor antenna the antenna control signal by multiplexing with a direct current power signal.

According to the antenna control system, it is preferable that the donor antenna further includes a signal demultiplexing module for demultiplexing a multiplexed signal received from the signal multiplexing module to the antenna control signal and the direct current power signal.

According to the antenna control system, it is preferable that the phase controller selects any one of the plurality of the transmission lines based on the antenna control signal and changes the orientation direction of the antenna module to a corresponding orientation direction.

According to the antenna control system, it is preferable that each of the plurality of the transmission lines has a phase delay value different from each other.

According to the antenna control system, it is preferable that the signal quality parameter is intensity of an output signal of the repeater or intensity of an input signal of the base station.

According to the antenna control system, it is preferable that, the generating module performs control to automatically change the orientation direction of the antenna module when a signal quality parameter regarding a current orientation direction of the antenna module is less than a certain threshold value, and the generating module performs control to fix the orientation direction of the antenna module to the current orientation direction when the signal quality parameter regarding the current orientation direction of the antenna module is equal to or greater than the certain threshold value.

According to the antenna control system, it is preferable that the analyzing module compares a signal quality parameter regarding a current orientation direction with a signal quality parameter regarding a direction close to the current orientation direction, the generating module performs control to fix the orientation direction of the antenna module to the current orientation direction when the signal quality parameter regarding the current orientation direction is equal to or greater than the signal quality parameter regarding the direction close to the current orientation direction, and the generating module performs control to automatically change the orientation direction of the antenna module when the signal quality parameter regarding the current orientation direction is less than the signal quality parameter regarding the direction close to the current orientation direction.

According to the antenna control system, it is preferable that the generating module searches for a direction from which a signal having a predetermined level or higher can be received from the base station in a predetermined time slot, and the predetermined time slot is a time slot when a usage amount of a radio resource of the base station is less than a predetermined reference.

An antenna control method according to an antenna control system which includes, to receive a signal from a base station, a donor antenna including an antenna module disposed by being fixed to an inner side of a window glass and configured with an array antenna; a phase shifter including a plurality of transmission lines; and a phase controller configured to control the phase shifter to change an orientation direction of the antenna module and a repeater including a generating module for generating an antenna control signal for controlling the orientation direction of the antenna module includes generating an antenna control signal for selecting any one of the plurality of the transmission lines of the phase shifter; transmitting the antenna control signal to the phase controller and creating a signal quality parameter in each orientation direction while automatically changing the orientation direction of the antenna module; comparing a first signal quality parameter regarding a first direction with a second signal quality parameter regarding a second direction among each of the orientation directions; and performing control to fix the orientation direction of the antenna module to the first direction when the first signal quality parameter is equal to or greater than the second signal quality parameter.

The advantages and/or features of the present invention and methods for realizing the same will become apparent from the following detailed descriptions of exemplary embodiments with reference to the attached drawings. However, the present invention is not limited to the exemplary embodiments described below and can be realized by various embodiments different from each other. The embodiments are provided to complete the disclosure of the present invention and to fully notify those skilled in the art of the scope of the present invention. The present invention is defined only by the appended claims. The same reference numerals are used throughout the specification to designate the same or similar components.

In the antenna control system and the method according to the present invention, an antenna direction is optimally and automatically set based on analysis results of signal quality parameters received from various directions, so that a communication quality can be improved and installation and maintenance management costs can be reduced as compared with manually adjusting an antenna orientation direction.

Further, in the antenna control system and the method according to the present invention, the mobile communication repeater is installed by attaching the donor antenna to a window in a room, so that there is no need to pierce a hole for drawing in the antenna, and an optimum orientation point between the antenna attached to the window and the adjacent base station can be consistently maintained.

DESCRIPTION OF THE EMBODIMENTS

Various embodiments of the present invention will be described in detail below with reference to the attached drawings. However, it is to be noted that the technical scope of the present invention is not limited to the described embodiments and encompasses the invention and equivalents described in a scope of claims.

Further, it is to be understood by those skilled in the art that various modifications, substitutions, and corrections of the embodiments can be made without departing from the scope and spirit of the present invention.

In the terms used in the present specification, a "direction from which a signal having a predetermined level or higher can be received" means a direction at which an evaluation result is equal to or greater than a threshold value of a specific signal quality when an evaluation result with respect to a signal quality in each direction is acquired by changing an orientation direction of the donor antenna according to an orientation angle corresponding to each transmission line.

Figure 1:
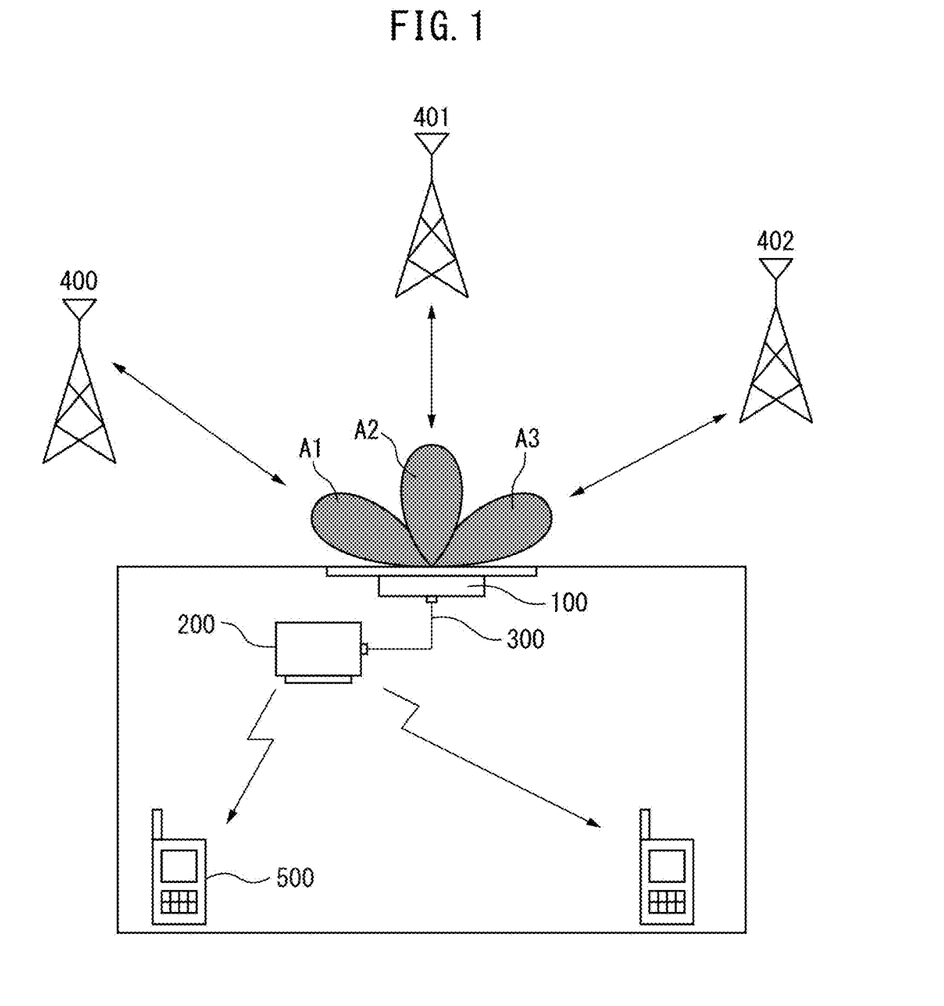
FIG. 1 is a drawing illustrating an antenna control system according to an embodiment of the present invention.

FIG. 1 is a drawing illustrating the antenna control system according to the embodiment of the present invention.

With reference to FIG. 1, the antenna control system includes a donor antenna 100 and a mobile communication repeater 200. The donor antenna 100 and the mobile communication repeater 200 can be connected with each other via a feeder wire 300. The feeder wire 300 is realized by a coaxial cable. In FIG. 1, the donor antenna 100 is installed outside the mobile communication repeater 200 by being separated therefrom as an example, however, the donor antenna 100 may be installed within the mobile communication repeater 200. The donor antenna 100 is installed by facing the mobile communication repeater 200 side. The donor antenna 100 may be installed by facing a direction other than the mobile communication repeater 200 side.

The donor antenna 100 is installed in such a manner that an orientation direction of the donor antenna 100 faces the base station to transmit and receive radio signals to and from the base station. The donor antenna 100 receives a signal from the base station and supplies the received signal to the mobile communication repeater 200. From among a plurality of base stations 400, 401, and 402 respectively having beam directions A1, A2, and A3, the donor antenna 100 receives a radio signal from the base station from which the radio signal can be most efficiently received.

The donor antenna 100 selects any one transmission line from a plurality of transmission lines which have predetermined orientation angles based on an antenna control radio signal received from the mobile communication repeater 200 via the feeder wire and changes the orientation direction of the donor antenna 100 according to the orientation angle corresponding to the selected transmission line.

The orientation direction can be changed by a beam orientation angle change method of the donor antenna 100. The beam orientation angle change method of the donor antenna 100 is to change an orientation direction of a beam of the donor antenna 100 to orient to a specific direction.

When a direction that the mobile communication repeater 200 can receive a signal having a predetermined level or higher from the base station is determined by the above-described processes, the orientation direction of the donor antenna 100 is changed to the relevant direction.

The mobile communication repeater 200 receives a radio signal from the donor antenna 100 and supplies the signal to a terminal device 500 in the room. The mobile communication repeater 200 can supply an antenna control signal to the donor antenna 100 via the feeder wire and perform control to change the orientation direction of the donor antenna 100 to the specific direction. The mobile communication repeater 200 determines the specific direction as the direction from which a signal having a predetermined level or higher can be received from the base station using the signal quality parameter from each direction and notifies the donor antenna 100 of the specific direction.

Figure 2:
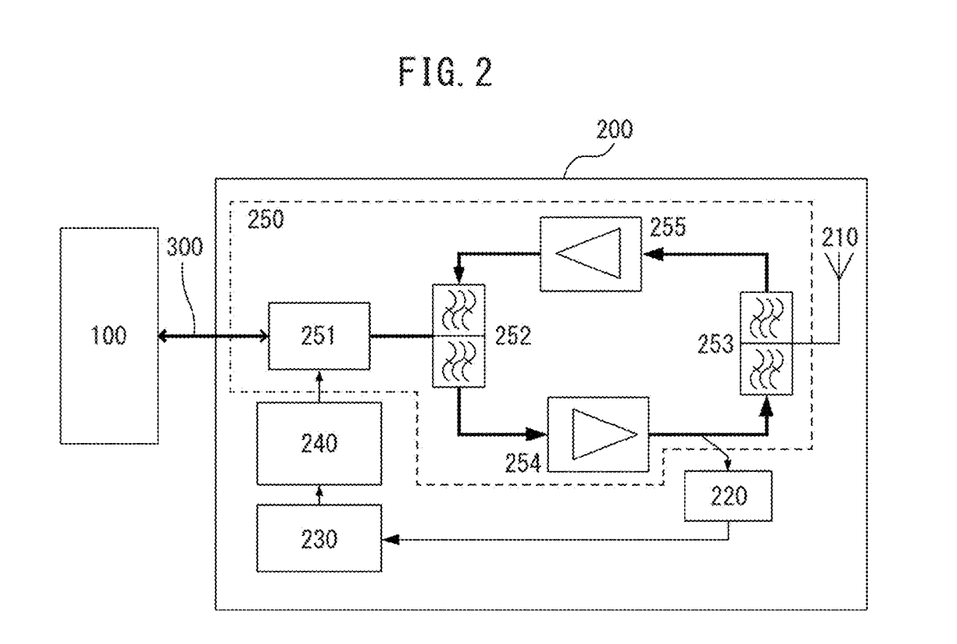
FIG. 2 is a block diagram illustrating an internal configuration of a mobile communication repeater in FIG. 1.

FIG. 2 is a block diagram illustrating an internal configuration of the mobile communication repeater in FIG. 1.

With reference to FIG. 2, the mobile communication repeater 200 includes a service antenna 210, a reception signal measuring module 220, a reception signal analyzing module 230, an antenna control signal generating module 240, and a transmission/reception unit 250.

A signal received from the donor antenna is transmitted to the mobile communication repeater 200 via the feeder wire. The signal transmitted to the mobile communication repeater 200 is transferred to the service antenna 210 by the transmission/reception unit 250. The transmission/reception unit 250 includes a signal multiplexing unit 251, a donor side duplexer 252, a service side duplexer 253, an upward amplifier 254, and a downward amplifier 255. The signal multiplexing module 251 multiplexes an antenna control signal and a high frequency signal and synthesizes the signal and a direct-current (DC) power necessary for operations of an antenna internal circuit so as to be able to be transmitted by a coaxial cable. The high frequency signal separated from the signal multiplexing module is input to the donor side duplexer 252. The duplexer distinguishes an upward direction and a downward direction, and transmits an upward signal and a downward signal respectively to the upward amplifier 254 and the downward amplifier 255 to amplify the respective signals. The signals distinguished upward and downward to be amplified are integrated again to a single path by the service side duplexer 253 and transmitted to the service antenna 210.

The service antenna 210 receives a radio signal from the donor antenna 100 and supplies the received radio signal to the reception signal measuring module 220.

The reception signal measuring module 220 measures intensity of at least one signal of an output signal of the mobile communication repeater 200 and an input signal of the base station using the radio signal received from the service antenna 210. The reception signal measuring module 220 measures a signal which is transmitted by the adjacent base station and received by the donor antenna by amplifying by the downward amplifier 255. The reception signal measuring module 220 measures total intensity obtained by integrating an entire bandwidth used for reception, signal intensity distinguished by the bandwidth, and others. The reception signal measuring module 220 supplies the signal intensity of at least one of the measured output signal and the input signal of the base station to the reception signal analyzing module 230.

The reception signal measuring module 220 receives a radio signal from the service antenna 210 and measures intensity of the input signal of the base station using the received radio signal.

The reception signal measuring module 220 receives a radio signal from the service antenna 210 and measures the output signal of the mobile communication repeater 200 when a signal based on the received radio signal is supplied to the terminal device in the room.

The reception signal analyzing module 230 uses a signal quality parameter in each orientation direction to which the donor antenna 100 is oriented to analyze the signal quality in the relevant direction. The reception signal analyzing module 230 supplies an analysis result of the signal quality from each direction of the donor antenna 100 to the antenna control signal generating module 240.

The reception signal analyzing module 230 determines whether the signal quality parameter in a first direction is equal to or greater than the signal quality parameter in a second direction among the signal quality parameters in each direction. When the signal quality parameter in the first direction is equal to or greater than the signal quality parameter in the second direction, the reception signal analyzing module 230 determines the first direction as the direction from which a signal having a predetermined level or higher can be received from the base station.

The reception signal analyzing module 230 may determine, according whether a signal quality parameter in a specific direction is equal to or greater than a specific signal quality threshold value among each of the orientation directions to which the donor antenna 100 is oriented, the relevant direction as the direction from which a signal having a predetermined level or higher can be received from the base station.

The reception signal analyzing module 230 may evaluate a signal quality in the first direction by measuring the signal quality parameter in the first direction among each of the orientation directions to which the donor antenna 100 is oriented and determine the first direction as the direction from which a signal having a predetermined level or higher can be received from the base station when the evaluation result is equal to or greater than the specific signal quality threshold value.

The reception signal analyzing module 230 may evaluate a signal quality (for example, signal intensity and a signal level) in the first direction by measuring the signal quality parameter in the first direction among each of the orientation directions to which the donor antenna 100 is oriented and determine that the first direction is not the direction from which a signal having a predetermined level or higher can be received from the base station when the evaluation result is equal to or less than the specific signal quality threshold value.

In addition, the reception signal analyzing module 230 automatically changes the orientation direction of the donor antenna 100 to the second direction to measure the signal quality parameter in the relevant direction, evaluates a signal quality (for example, signal intensity and a signal level) in the second direction using the signal quality parameter in the second direction, and analyzes whether the evaluation result is equal to or greater than the specific signal quality threshold value. When the evaluation result of the signal quality in the second direction is equal to or greater than the specific signal quality threshold value, the reception signal analyzing module 230 may determine the second direction as the direction from which a signal having a predetermined level or higher can be received from the base station.

In other words, the reception signal analyzing module 230 repeats the above-described processing until the orientation direction of the donor antenna 100 is searched in which a quality parameter equal to or greater than the specific signal quality threshold value is measured. At that time, the reception signal analyzing module 230 searches for the direction from which a signal having a predetermined level or higher can be received from the base station in a predetermined time slot. The reception signal analyzing module 230 searches for the direction from which a signal having a predetermined level or higher can be received from the base station in a time slot when a usage amount of a radio resource of the base station is less than a predetermined reference. For example, the reception signal analyzing module 230 can search for the direction from which a signal having a predetermined level or higher can be received from the base station in a time slot when no call is made by a user.

The reception signal analyzing module 230 measures the signal quality parameter in each direction, evaluates a signal from the relevant direction, and records the evaluation result. The reception signal analyzing module 230 compares a signal quality of a current orientation direction with the recorded evaluation result and determines the current orientation direction as the direction from which a signal having a predetermined level or higher can be received from the base station.

The reception signal analyzing module 230 compares the evaluation result with respect to the signal quality in the current orientation direction with an evaluation result with respect to a direction close to the evaluation result with respect to the current orientation direction among the recorded evaluation results. When the evaluation result with respect to the signal quality in the current orientation direction is better than the evaluation result with respect to the direction close to the current orientation direction as a result of comparison, the reception signal analyzing module 230 may determine the current orientation direction as the direction from which a signal having a predetermined level or higher can be received from the base station.

Further, the reception signal analyzing module 230 compares the evaluation result with respect to the signal quality in the current orientation direction with the evaluation result with respect to the direction close to the evaluation result with respect to the current orientation direction among the recorded evaluation results. When the evaluation result with respect to the signal quality in the current orientation direction is worse than the evaluation result with respect to the direction close to the current orientation direction as a result of comparison, the reception signal analyzing module 230 may determine that the current orientation direction is not the direction from which a signal having a predetermined level or higher can be received from the base station.

The reception signal analyzing module 230 automatically changes the orientation direction of the donor antenna 100 to another direction, measures the signal quality parameter in the relevant direction, and evaluates the signal quality in the relevant direction to determine whether the relevant direction is the direction from which a signal having a predetermined level or higher can be received from the base station. In other words, the reception signal analyzing module 230 repeats the above-described processes until the direction from which a signal having a predetermined level or higher can be received from the base station is determined.

The antenna control signal generating module 240 receives an analysis result of the signal quality parameter in the specific direction from the reception signal analyzing module 230 and generates an antenna control signal for controlling the orientation direction of the donor antenna 100 using the analysis result of the received signal quality parameter in the specific direction. The antenna control signal generating module 240 supplies the generated antenna control signal to the signal multiplexing module 251 of the transmission/reception unit 250.

The antenna control signal generating module 240 generates the antenna control signal for orienting the donor antenna 100 to a direction different in the past in response to a request from the reception signal analyzing module 230. For example, if the antenna control signal for orienting to the first direction is generated in the past, the antenna control signal generating module 240 can generate the antenna control signal for orienting the donor antenna 100 to the second direction.

The antenna control signal generating module 240 generates the antenna control signal for changing the orientation direction of the donor antenna 100 to the specific direction based on the analysis result of the signal quality parameter, received from the reception signal analyzing module 230, with respect to each orientation direction to which the donor antenna 100 is oriented. For example, when the reception signal analyzing module 230 analyzes that a fourth direction is the direction from which a signal having a predetermined level or higher can be received from the base station among the first direction to a seventh direction, the antenna control signal generating module 240 generates the antenna control signal for changing the orientation direction of the donor antenna 100 to the fourth direction.

The signal multiplexing module 251 of the transmission/reception unit 250 generates a multiplexed signal by multiplexing a DC power source, a radio frequency (RF) signal, and the antenna control signal received from the antenna control signal generating module 240. The signal multiplexing module 251 supplies the generated multiplexed signal to the donor antenna 100 via the feeder wire 300.

According to the embodiment of the present invention, the signal multiplexing module 251 can receive the antenna control signal from the antenna control signal generating module 240 and generate the multiplexed signal by multiplexing the antenna control signal and the DC power supplied to the donor antenna 100.

Figure 3:
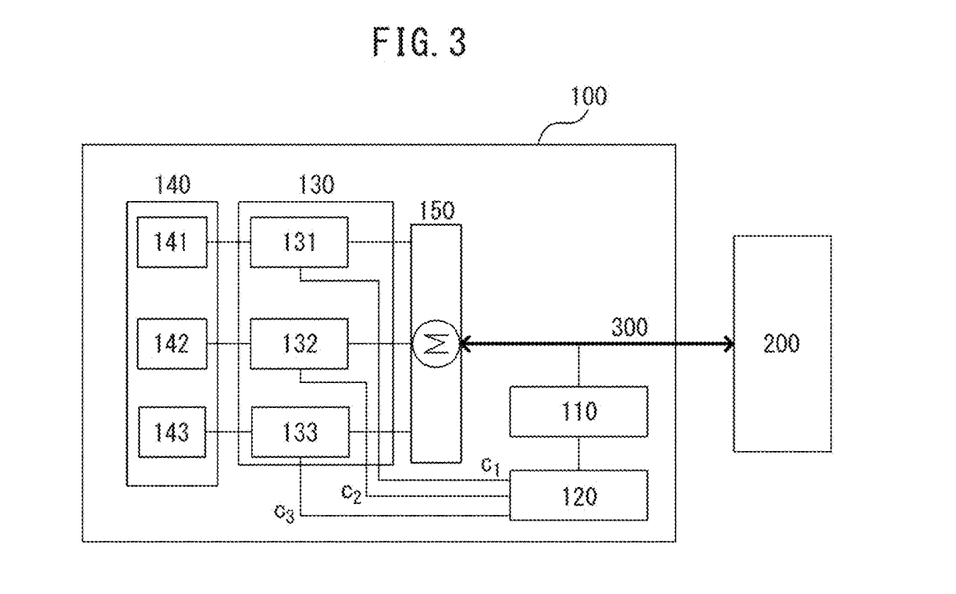
FIG. 3 is a block diagram illustrating an internal configuration of a donor antenna in FIG. 1.

FIG. 3 is a block diagram illustrating an internal configuration of the donor antenna 100 in FIG. 1.

With reference to FIG. 3, the donor antenna 100 includes a signal demultiplexing module 110, a phase controller 120, a phase shifter 130, and an antenna module 140. The antenna module 140 includes individual antennas 141, 142, and 143.

The phase controller 120 controls the phase shifter 130 to control any one transmission line based on the antenna control signal from the plurality of the transmission lines each of which has a predetermined orientation angle in the phase shifter 130. The phase shifter 130 includes individual components 131, 132, and 133, and the respective components are controlled by control signals $c_1$, $c_2$, and $c_3$.

The phase shifter 130 changes an orientation direction of the antenna module 140 using phase delay included in any one of the plurality of the transmission lines according to the control by the phase controller 120. Each of the plurality of the transmission lines can have a length different from each other according to a phase delay value. The orientation direction can be changed by a beam orientation angle change method of the antenna module 140.

Figure 4:
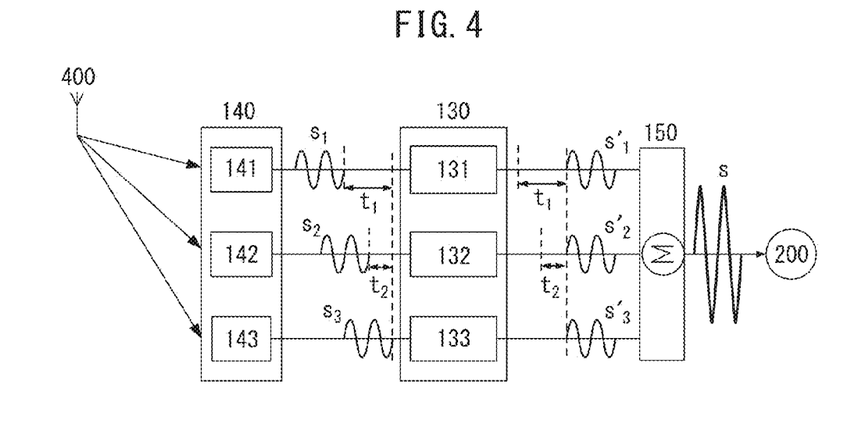
FIG. 4 is a block diagram illustrating operations of a phase shifter and an array antenna in FIG. 3.

FIG. 4 is a block diagram illustrating operations of the phase shifter 130 and the array antenna 140 in FIG. 3.

A variable directivity antenna capable of electrically changing a main beam direction of an antenna includes two or more antennas arranged therein, changes a phase of each antenna, and synthesizes these outputs. Each antenna of the antenna module 140 has the same performance, and the phase shifter 130 can adjust a phase delay value according to an angle of an incident wave reaching each antenna.

FIG. 4 illustrates an example when a phase $s_2$ of a second antenna is delayed about $t_2$ than a phase $s_3$ of a third antenna, and a phase $s_1$ of a first antenna is delayed about $t_1$ than the phase $s_2$ of the second antenna. The phase shifter 130 delays an output $s'_1$ of the first antenna and an output $s'_2$ of the second antenna so as to be the same phase as an output $s'_2$ of the third antenna based on calculation by a built-in microprocessor and synthesizes the three signals in the same phase by a signal synthesizer 150 to obtain a maximum output S.

Figure 5:
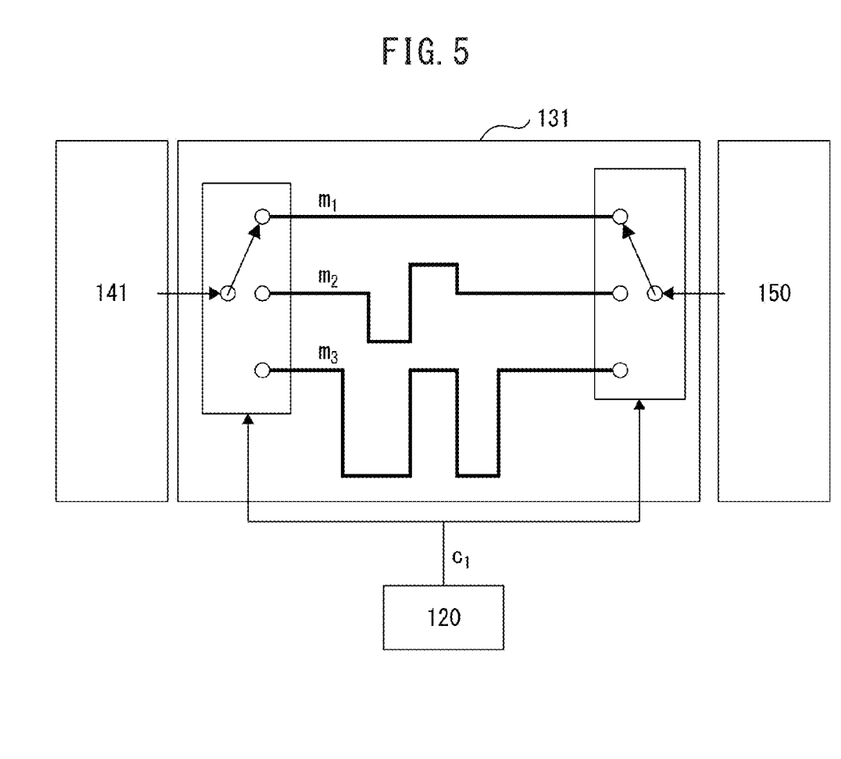
FIG. 5 is a drawing illustrating transmission lines of the phase shifter in FIG. 3.

FIG. 5 is a drawing illustrating transmission lines of the phase shifter 130 in FIG. 3.

The phase shifter 130 includes a plurality of transmission lines $m_1$, $m_2$, and $m_3$ which have lengths different from each other, and the phase controller 120 selects a transmission line most appropriate for a condition of an input signal from the repeater by the built-in microprocessor and adjusts a beam direction of the antenna 141 of the antenna module by the control signal $c_1$.

Figure 6:
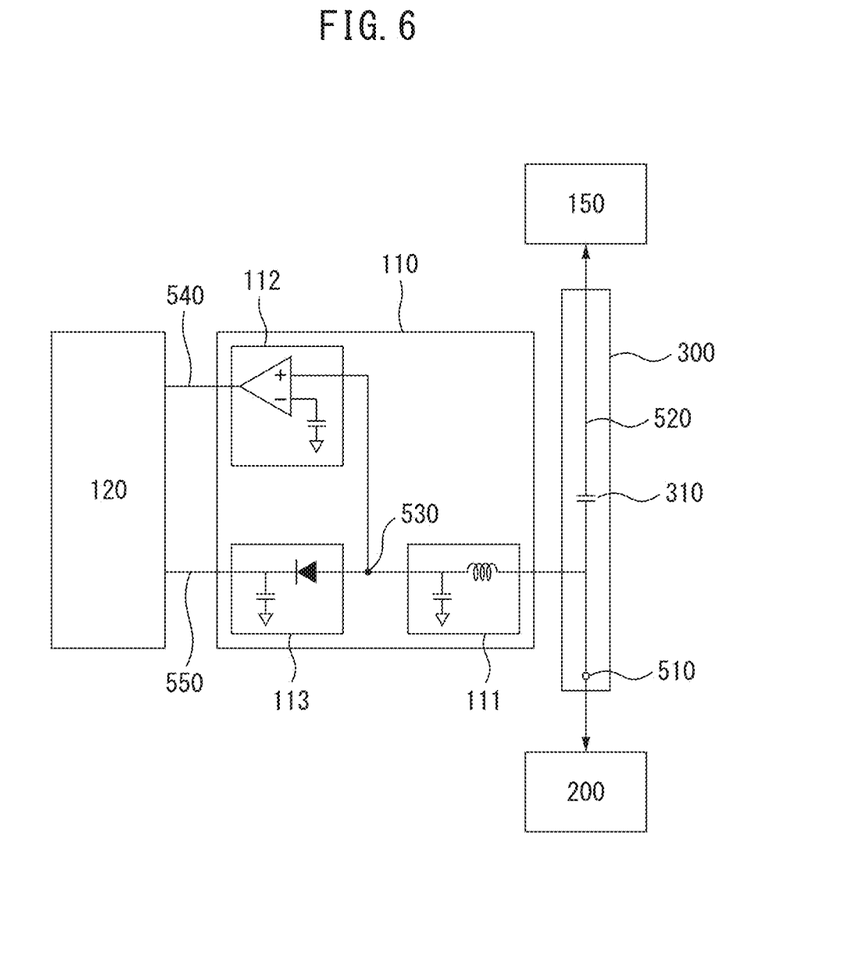
FIG. 6 is a block diagram illustrating the donor antenna in FIG. 3 in detail.

FIG. 6 is a block diagram illustrating the signal demultiplexing module 110 of the donor antenna 100 in FIG. 3 in detail.

The signal demultiplexing module 110 includes a signal separation module 111, an antenna control signal extraction module 112, and a DC extraction module 113.

The signal demultiplexing module 110 receives the multiplexed signal from the mobile communication repeater 200 via the feeder wire 300 and demultiplexes the received multiplexed signal. The signal demultiplexing module 110 receives a multiplexed signal 510 from the mobile communication repeater 200, and a high-frequency wave 520 is separated by the signal separation module 111 and a DC cut capacitor 310. The signal separation module 111 separates an antenna control signal 540 and a direct current 530 from the received multiplexed signal 510 and supplies the antenna control signal 540 and the direct current 530 to each of the antenna control signal extraction module 112 and the DC extraction module 113. The antenna control signal extraction module 112 extracts the antenna control signal 540 from the signal 530 received from the signal separation module 111 and supplies the antenna control signal 540 to the microprocessor of the phase controller. The DC extraction module 113 extracts a direct current 550 from the signal 530 received from the signal separation module 111 and supplies the direct current 550 to the microprocessor of the phase controller.

Figure 7:
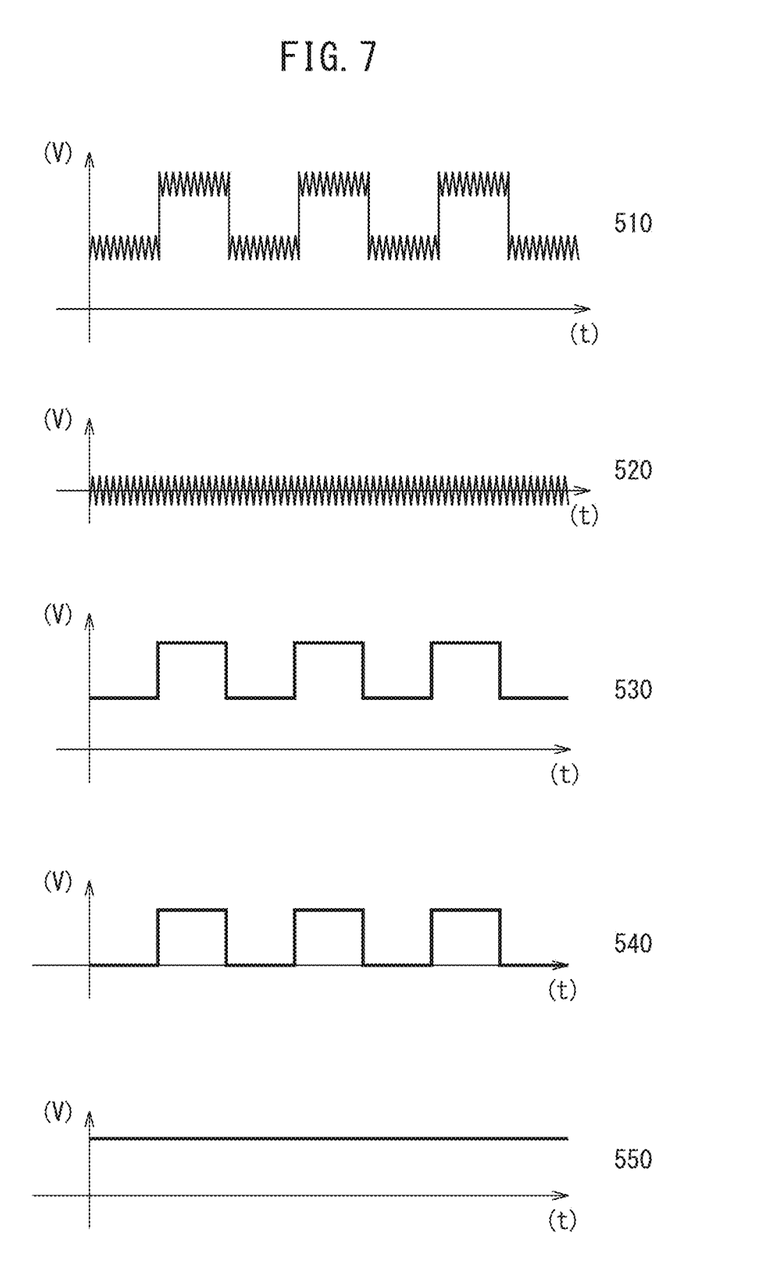
FIG. 7 is a drawing illustrating signals output from each block in FIG. 6.

FIG. 7 is a drawing illustrating signals output from each block in FIG. 6.

FIG. 7 illustrates signals, namely the high-frequency signal 520, the antenna control signal 540, the DC power signal 550, and the signal 510 obtained by multiplexing these signals, which are transmitted through the feeder wire line connecting the repeater and the donor antenna on a basis of a time axis. Each signal 510 to 550 in FIG. 7 corresponds to a signal measured at each point 510 to 550 of the donor antenna in FIG. 6. The signal 510 transmitted from the signal multiplexing module 251 of the mobile communication repeater 200 to the donor antenna includes the donor antenna control signal 540, the electrical signal 550, and the high-frequency signal 520. The signal 510 is separated into the DC signal 530 including the donor antenna control signal 540 and the electrical signal 550 and the high-frequency signal 520 by the signal separation module 111 and the DC cut capacitor. The DC signal 530 is separated into the digital signal 540 for antenna control and the electrical signal 550 for power supply by the antenna control signal extraction module 112 and the DC extraction module 113 and supplied as an input to the microprocessor built in the phase controller.

Figure 8:
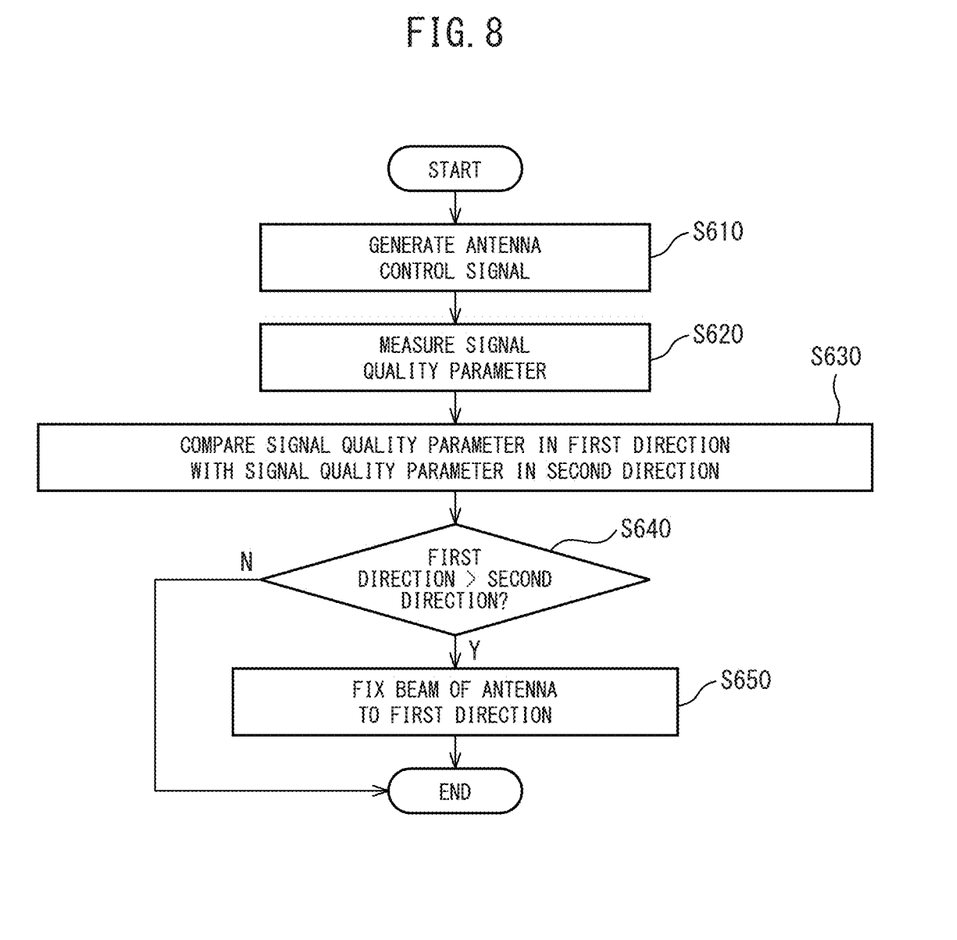
FIG. 8 is a flowchart illustrating processing by the mobile communication repeater.

FIG. 8 is a flowchart illustrating processing by the mobile communication repeater.

Control in each step in FIG. 8 is executed by a processor of the antenna control signal generating module 240 based on a control program stored in a storage unit of the antenna control signal generating module 240.

With reference to FIG. 8, the antenna control signal generating module 240 of the mobile communication repeater 200 generates an antenna control signal for controlling the orientation direction of the donor antenna 100 (step S610). The reception signal measuring module 220 of the mobile communication repeater 200 supplies the antenna control signal to the donor antenna 100 and measures the signal quality parameter in each direction (for example, seven directions) while changing the orientation direction of the donor antenna 100 (step S620). The orientation direction is changed by the beam orientation angle change method of the donor antenna 100.

The reception signal analyzing module 230 of the mobile communication repeater 200 compares whether the signal quality parameter in the first direction is equal to or greater than the signal quality parameter in the second direction among the signal quality parameters of each direction. When the signal quality parameter in the first direction is equal to or greater than the signal quality parameter in the second direction (step S640), the antenna control signal generating module 240 of the mobile communication repeater 200 fixes a beam of the antenna to the first direction (step S650). In other words, the mobile communication repeater 200 compares the signal quality parameter in each direction with each other to determine the direction from which a signal having a predetermined level or higher can be received from the base station and fixes the orientation direction of the donor antenna 100 to the relevant direction.

The mobile communication repeater 200 measures the signal quality parameter in the specific direction among each of the directions to evaluate the signal quality (for example, signal intensity and a signal level) in the relevant direction. When the evaluation result is equal to or less than a specific signal quality threshold value, the mobile communication repeater 200 changes the orientation direction to another direction to measure the signal quality parameter in the relevant direction and evaluates the signal quality in the relevant direction.

At that time, the mobile communication repeater 200 can search for the direction from which a signal having a predetermined level or higher can be received from the base station in a time slot when the usage amount of the radio resource of the base station is less than the predetermined reference. For example, the mobile communication repeater 200 searches for the direction from which a signal having a predetermined level or higher can be received from the base station in a time slot when no call is made by a user.

It is not illustrated in FIG. 8, the reception signal measuring module 220 of the mobile communication repeater 200 measures the evaluation result of the signal quality in each direction. The reception signal analyzing module 230 evaluates a signal from the relevant direction to record the evaluation result and compares the evaluation result of the signal quality in the current orientation direction with the evaluation result in a direction close to the current orientation direction among the above-described recorded evaluation results. When the evaluation result of the signal quality in the current orientation direction is worse than the evaluation result in the direction close to the current orientation direction among the above-described recorded evaluation results as a result of comparison, the antenna control signal generating module 240 of the mobile communication repeater 200 automatically changes the orientation direction to another direction, and the reception signal measuring module 220 further measures the signal quality parameter in the relevant direction and evaluates the signal quality in the relevant direction. On the other hand, when the evaluation result of the signal quality in the current orientation direction is better than the evaluation result in the direction close to the current orientation direction among the above-described recorded evaluation results as a result of comparison, the antenna control signal generating module 240 of the mobile communication repeater 200 determines the current orientation direction as the direction from which a signal having a predetermined level or higher can be received from the base station.

When intensity of the output signal of the mobile communication repeater 200 becomes equal to or less than specific intensity, the mobile communication repeater 200 repeats the processing in FIG. 8 to determine the direction from which a signal having a predetermined level or higher can be received from the base station and fixes the orientation direction of the donor antenna 100 to the relevant direction. A reason why the intensity of the output signal of the mobile communication repeater 200 becomes equal to or less than the specific intensity is that isolation (ratio of power transmission amount) between the donor antenna and the service antenna built in the above-described mobile communication repeater 200 becomes smaller. When the intensity of the output signal becomes equal to or greater than the specific intensity, the mobile communication repeater 200 repeats the processing in FIG. 8 to determine the direction from which a signal having a predetermined level or higher can be received from the base station and fixes the orientation direction of the donor antenna 100 to the relevant direction. A reason why the intensity of the output signal of the mobile communication repeater becomes equal to or greater than the specific intensity is that a new base station is newly installed around the mobile communication repeater 200.

Figure 9:
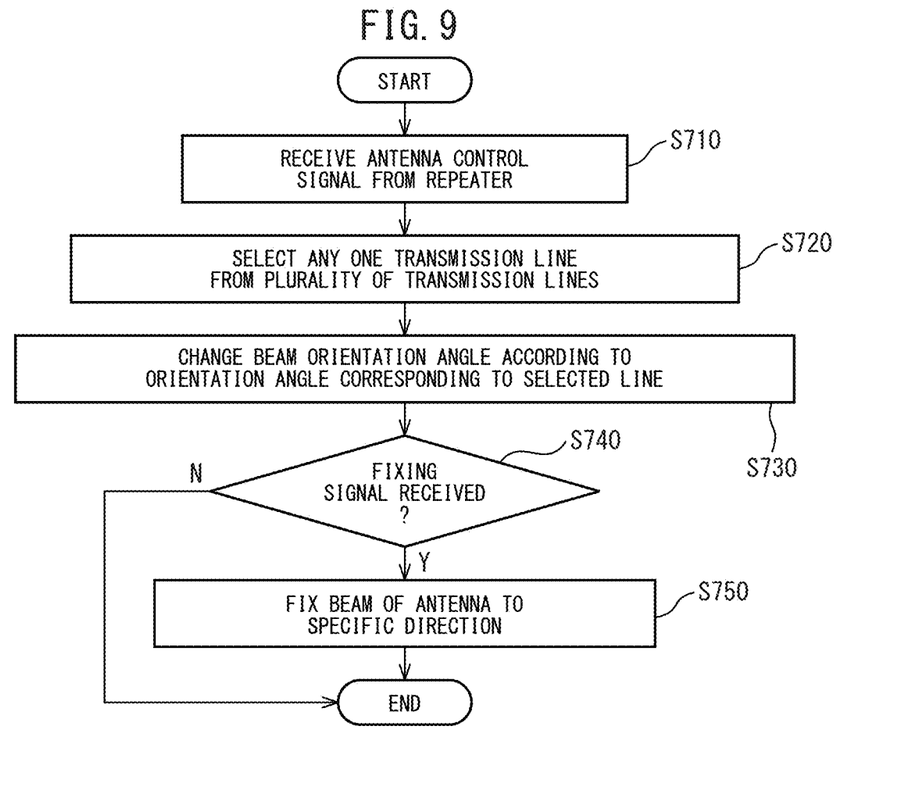
FIG. 9 is a flowchart illustrating processing by the donor antenna.

FIG. 9 is a flowchart illustrating processing by the donor antenna.

The processing in each step in FIG. 9 is executed by the microprocessor of the phase controller 120 based on a control program stored in a storage unit of the phase controller 120.

With reference to FIG. 9, the donor antenna 100 receives an antenna control signal from the mobile communication repeater 200 (step S710). The phase controller 120 of the donor antenna 100 selects any one transmission line based on the antenna control signal from the plurality of the transmission lines each of which has a predetermined orientation angle (step S720). The phase controller 120 of the donor antenna 100 changes the orientation direction according to the orientation angle corresponding to the selected transmission line among the plurality of the transmission lines (step S730). The orientation direction can be changed by the beam orientation angle change method of the donor antenna 100. According to whether a control signal of the mobile communication repeater 200 is received or not (step S740), the phase controller 120 of the donor antenna 100 fixes the antenna orientation direction to a specific direction (step S750).

Figure 10:
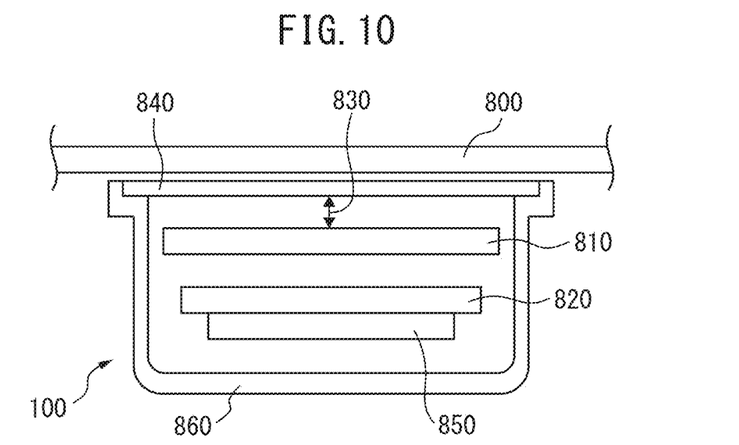
FIG. 10 is a cross section of the donor antenna.

FIG. 10 is a cross section of the donor antenna 100 in FIG. 1.

With reference to FIG. 10, the donor antenna 100 includes an antenna front plate 840 to be attached to a glass window 800, a first patch 810 (for example, a parasitic patch) disposed at a specific distance away from the glass window 800, a second patch 820 (for example, a micro strip patch) disposed at a predetermined distance away from the first patch, and a case 860 for protecting components of the donor antenna. In other words, the donor antenna 100 has a double patch structure using the first patch 810 and the second patch 820.

The first patch 810 is disposed away from the glass window 800 by an interval of 6 to 9 mm. Generally, a resonance frequency of the donor antenna 100 changes when being near to a high dielectric constant object, for example, the glass window 800. In order to prevent the above-described matter, the first patch 810 can be disposed by separating the donor antenna 100 at a distance, for example 7 mm, away from the glass window 800 within a range in which the resonance frequency of the donor antenna 100 can be adjusted.

As described above, when the first patch 810 is separated at the specific distance away from the glass window, a resonance frequency variation becomes about 5%. Such the resonance frequency variation can be designed so as to be a band width covering a band width variation of an operating frequency of the donor antenna 100 itself. In addition, a patch antenna can be produced by considering the resonance frequency of the donor antenna 100 itself in advance while expecting the resonance frequency variation occurring when the donor antenna 100 is attached to the glass window 800.

On a rear surface of the second patch 820, a phase control unit 850 for installing components, such as the phase shifter 130, the phase controller 120, and the signal demultiplexing module 110, is disposed, and a metallic reflector can be disposed on a rear surface 862 of the case or a rear surface of the second patch antenna. The metallic reflector can be realized by coating a rear surface of the case with a conductive metal, such as aluminum. The metallic reflector functions as a reflector and can improve a signal quality by minimizing an effect of irregular reflection or the like.

Figure 11:
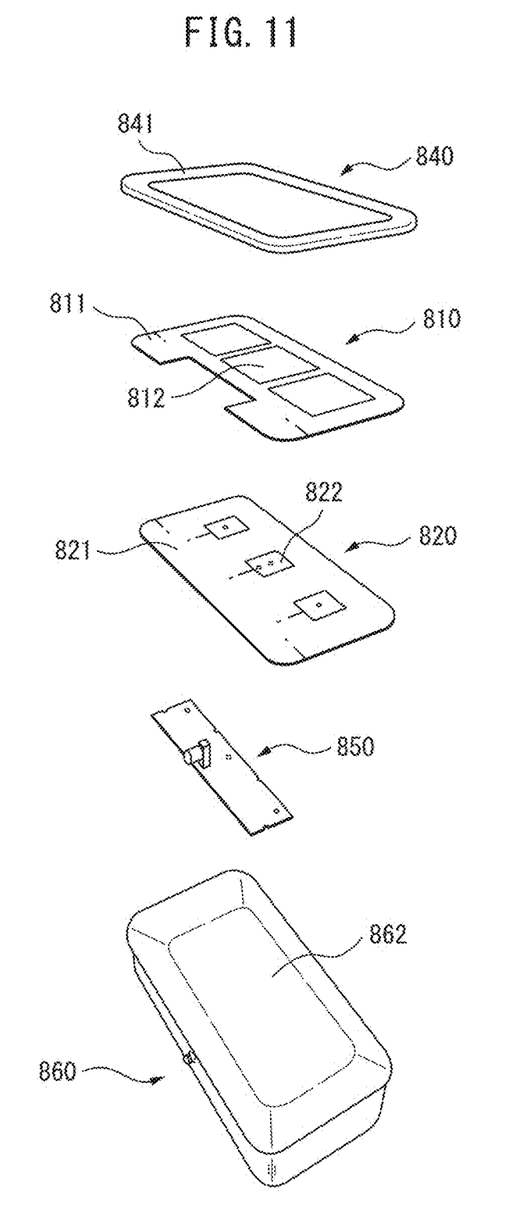
FIG. 11 is an exploded perspective view illustrating each component in the donor antenna.

FIG. 11 is an exploded perspective view illustrating each component in the donor antenna and the case illustrated in FIG. 10.

The first patch antenna 810 disposed on a glass window side includes an antenna board 811 and a metal patch 812. The second patch antenna 820 which is disposed by being separated at a predetermined distance away from the first patch antenna 810 includes an antenna board 821 and a metal patch 822. The antenna front plate 840 is a portion directly attached to a glass window. When the donor antenna 100 is attached to a window glass, the antenna front plate 840 is attached to a glass window by, for example, a double-sided stick tape and the like. The phase control unit 850 includes the phase shifter 130, the phase controller 120, the signal demultiplexing module 110, and the like. The case 860 protects the donor antenna and is connected to the antenna front plate 840 to enable the donor antenna to be fixed on a glass window.

Figure 12:
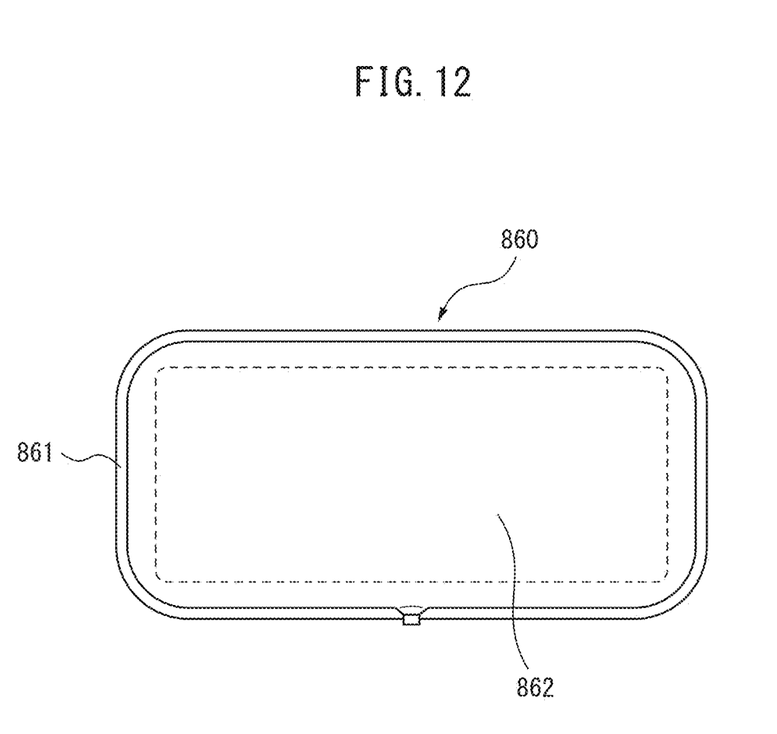
FIG. 12 is a drawing illustrating a case of the donor antenna.

FIG. 12 is a plan view of the case 860 of the donor antenna as seen from an indoor side.

To the case 860, a plate-shaped metal section 861 is attached around the first patch antenna so as to protrude from an end portion of the case. The plate-shaped metal section 861 is placed on a front surface portion of the case 860 and can contact with an end portion 841 of the antenna front plate 840. The plate-shaped metal section functions as an additional reflector and can improve a signal quality by minimizing an effect of irregular reflection or the like.

DESCRIPTION OF THE REFERENCE NUMERAL

100 Donor antenna
110 Signal demultiplexing module
120 Phase controller
130 Phase shifter
140 Antenna module
200 Mobile communication repeater
210 Service antenna
220 Reception signal measuring module
230 Reception signal analyzing module
240 Antenna control signal generating module
250 Transmission/reception unit
251 Signal multiplexing module
300 Feeder wire
310 DC cut capacitor
400 Base station
500 Terminal
810 First patch antenna
820 Second patch antenna
840 Antenna front plate
850 Phase control unit
860 Case

What is claimed is:

1. An antenna control system for receiving a signal from a base station, the antenna control system comprising: a donor antenna comprising an antenna module disposed by being fixed to an inner side of a window glass of a room and configured with an array antenna; a phase shifter including a plurality of transmission lines; and a phase controller configured to control the phase shifter to change an orientation direction of the antenna module, wherein the donor antenna; and a repeater, which is installed in the room, comprising a measuring module for measuring a reception signal received by the antenna module; an analyzing module for analyzing a signal quality parameter in each orientation direction of the antenna module based on a measurement result of the measuring module; a generating module for generating an antenna control signal for controlling the orientation direction of the antenna module based on an analysis result of the analyzing module, and a service antenna, different from the antenna module, configured to transmit a radio signal based on a reception signal received by the antenna module to a terminal device in the room, wherein the donor antenna further comprises a metallic reflector disposed on a rear surface of the second patch antenna and a plate-shaped metal section disposed around the first patch antenna.

2. The antenna control system according to claim 1 further comprising a feeder wire configured to transmit the antenna control signal to the phase controller.

3. The antenna control system according to claim 1, wherein the antenna module includes a plurality of individual antennas, and each of the individual antennas of the antenna module comprises a first patch antenna disposed by being separated at a predetermined distance away from the inner side of the window glass and a second patch antenna disposed by being separated at a predetermined distance away from the first patch antenna.

4. The antenna control system according to claim 1, wherein the repeater further comprises a signal multiplexing module for supplying to the donor antenna the antenna control signal by multiplexing with a direct current power signal.

5. The antenna control system according to claim 4, wherein the donor antenna further comprises a signal demultiplexing module for demultiplexing a multiplexed signal received from the signal multiplexing module to the antenna control signal and the direct current power signal.

6. The antenna control system according to claim 1, wherein the phase controller selects any one of the plurality of the transmission lines based on the antenna control signal and changes the orientation direction of the antenna module to a corresponding orientation direction.

7. The antenna control system according to claim 1, wherein each of the plurality of the transmission lines has a different phase delay value.

8. The antenna control system according to claim 1, wherein the signal quality parameter is an intensity of an output signal of the repeater or intensity of an input signal of the base station.

9. The antenna control system according to claim 1, wherein the generating module automatically changes the orientation direction of the antenna module when a signal quality parameter regarding a current orientation direction of the antenna module is less than a certain threshold value, and fixes the orientation direction of the antenna module to the current orientation direction when the signal quality parameter regarding the current orientation direction of the antenna module is equal to or greater than the certain threshold value.

10. The antenna control system according to claim 1, wherein the analyzing module compares a signal quality parameter regarding a current orientation direction with a signal quality parameter regarding a direction close to the current orientation direction, wherein the generating module fixes the orientation direction of the antenna module to the current orientation direction when the signal quality parameter regarding the current orientation direction is equal to or greater than the signal quality parameter regarding the direction close to the current orientation direction, and wherein the generating module automatically changes the orientation direction of the antenna module when the signal quality parameter regarding the current orientation direction is less than the signal quality parameter regarding the direction close to the current orientation direction.

11. The antenna control system according to claim 1, wherein the generating module searches for a direction from which a signal having a predetermined level or higher can be received from the base station in a predetermined time slot, and wherein the predetermined time slot is a time slot when a usage amount of a radio resource of the base station is less than a predetermined reference.

12. An antenna control method according to an antenna control system which comprises, to receive a signal from a base station, a donor antenna comprising an antenna module disposed by being fixed to an inner side of a window glass of a room and configured with an array antenna; a phase shifter including a plurality of transmission lines; and a phase controller configured to control the phase shifter to change an orientation direction of the antenna module and a repeater installed in the room and comprising a generating module for generating an antenna control signal for controlling the orientation direction of the antenna module, the antenna control method comprising: generating an antenna control signal for selecting any one of the plurality of the transmission lines of the phase shifter; transmitting the antenna control signal to the phase controller and creating a signal quality parameter in each orientation direction while automatically changing the orientation direction of the antenna module; comparing a first signal quality parameter regarding a first direction with a second signal quality parameter regarding a second direction among each of the orientation directions; and performing control to fix the orientation direction of the antenna module to the first direction when the first signal quality parameter is equal to or greater than the second signal quality parameter; and transmitting a radio signal based on a reception signal received by the antenna module to a terminal device in the room, by a service antenna different from the antenna module and installed in the room, wherein the donor antenna further comprises a metallic reflector disposed on a rear surface of the second patch antenna and a plate-shaped metal section disposed around the first patch antenna.

* * * * *

UNITED STATES PATENT AND TRADEMARK OFFICE
CERTIFICATE OF CORRECTION

| | |
|---|---|
| PATENT NO. | : 9,935,368 B2 |
| APPLICATION NO. | : 14/767470 |
| DATED | : April 3, 2018 |
| INVENTOR(S) | : Akihiko Tajika et al. |

It is certified that error appears in the above-identified patent and that said Letters Patent is hereby corrected as shown below:

In the Specification

Column 1, Line 9    Delete "PCT/W2014/053356",
Insert --PCT/JP2014/053356--

Signed and Sealed this
Sixteenth Day of July, 2019

Andrei Iancu
*Director of the United States Patent and Trademark Office*